(12) United States Patent
Clark et al.

(10) Patent No.: US 12,715,600 B1
(45) Date of Patent: Aug. 25, 2026

(54) PACKAGING ELECTRONIC CONTROLLER(S) FOR AIRCRAFT PROPULSION SYSTEM

(71) Applicant: RTX Corporation, Farmington, CT (US)

(72) Inventors: Thomas E. Clark, Wells, ME (US); Murat Yazici, Glastonbury, CT (US)

(73) Assignee: RTX Corporation, Farmington, CT (US)

( * ) Notice: Subject to any disclaimer, the term of this patent is extended or adjusted under 35 U.S.C. 154(b) by 0 days.

(21) Appl. No.: 19/210,790

(22) Filed: May 16, 2025

(51) Int. Cl.
*B64D 31/18* (2024.01)
*B64D 27/33* (2024.01)

(52) U.S. Cl.
CPC ............. *B64D 31/18* (2024.01); *B64D 27/33* (2024.01)

(58) Field of Classification Search
CPC ........ B64D 31/18; B64D 27/33; B64D 27/24; B64D 27/02; B64D 31/00
See application file for complete search history.

(56) References Cited

U.S. PATENT DOCUMENTS

| | | | | |
|---|---|---|---|---|
| 5,553,449 | A | 9/1996 | Rodgers | |
| 10,364,750 | B2 | 7/2019 | Rambo | |
| 11,739,662 | B1 * | 8/2023 | Mathews, Jr. | B64D 31/00 415/220 |
| 2021/0372327 | A1 | 12/2021 | Moniz | |
| 2022/0063824 | A1 * | 3/2022 | Hiett | B64D 31/12 |
| 2023/0211888 | A1 * | 7/2023 | Wang | B64D 31/06 701/3 |
| 2023/0340907 | A1 * | 10/2023 | Mathews, Jr. | B64D 27/10 |
| 2024/0418132 | A1 * | 12/2024 | Cafaro | F02C 9/00 |
| 2025/0250940 | A1 * | 8/2025 | Clark | F02K 3/06 |

* cited by examiner

*Primary Examiner* — Rodney A Bonnette
(74) *Attorney, Agent, or Firm* — Getz Balich LLC

(57) ABSTRACT

An assembly is provided for an aircraft propulsion system. This assembly includes an engine case, a nacelle wall and an electronic controller. The engine case is configured to house a bladed rotor of a turbine engine. The engine case extends axially along and circumferentially about an axis. The nacelle wall extends axially along and circumferentially about the engine case. The nacelle wall is spaced radially outboard from the engine case by a housing compartment. The housing compartment is formed by and radially between the engine case and the nacelle wall. The electronic controller is disposed in the housing compartment radially next to an inner side of the nacelle wall. A geometry of an outer side of the electronic controller matches a geometry of the inner side of the nacelle wall in a lateral reference plane perpendicular to the axis.

19 Claims, 4 Drawing Sheets

PACKAGING ELECTRONIC CONTROLLER(S) FOR AIRCRAFT PROPULSION SYSTEM

BACKGROUND OF THE DISCLOSURE

1. Technical Field

This disclosure relates generally to an aircraft and, more particularly, to electronics for an aircraft propulsion system.

2. Background Information

An aircraft propulsion system includes various electronic devices and systems. Various types and configurations of electronic devices and systems for an aircraft propulsion system are known in the art. While these known electronic devices and systems have various benefits, there is still room in the art for improvement.

SUMMARY OF THE DISCLOSURE

According to an aspect of the present disclosure, an assembly is provided for an aircraft propulsion system. This assembly includes an engine case, a nacelle wall and an electronic controller. The engine case is configured to house a bladed rotor of a turbine engine. The engine case extends axially along and circumferentially about an axis. The nacelle wall extends axially along and circumferentially about the engine case. The nacelle wall is spaced radially outboard from the engine case by a housing compartment. The housing compartment is formed by and radially between the engine case and the nacelle wall. The electronic controller is disposed in the housing compartment radially next to an inner side of the nacelle wall. A geometry of an outer side of the electronic controller matches a geometry of the inner side of the nacelle wall in a lateral reference plane perpendicular to the axis.

According to another aspect of the present disclosure, another assembly is provided for an aircraft propulsion system. This assembly includes a rotating structure, an engine case, a nacelle wall, an electric machine and an electric machine controller. The rotating structure includes a bladed compressor rotor and/or a bladed turbine rotor. The rotating structure is configured to rotate about an axis. The engine case extends axially along and circumferentially about the rotating structure. The nacelle wall extends axially along and circumferentially about the engine case with a housing compartment radially between the engine case and the nacelle wall. The electric machine is disposed in the housing compartment and is operatively coupled to the rotating structure. The electric machine is mounted to the engine case with a first distance radially between the electric machine and the engine case. The electric machine controller is disposed in the housing compartment. The electric machine controller is mounted to the engine case with a second distance radially between the electric machine controller and the engine case. The second distance is greater than the first distance.

According to still another aspect of the present disclosure, another assembly is provided for an aircraft propulsion system. This assembly includes a rotating structure, an engine case, a nacelle wall, an electric machine and an electric machine controller. The rotating structure includes a bladed compressor rotor and/or a bladed turbine rotor. The rotating structure is configured to rotate about an axis. The engine case extends axially along and circumferentially about the rotating structure. The nacelle wall extends axially along and circumferentially about the engine case with a housing compartment radially between the engine case and the nacelle wall. The electric machine is disposed in the housing compartment and is operatively coupled to the rotating structure. The electric machine is mounted to the engine case with a first distance radially between the electric machine and the nacelle wall. The electric machine controller is disposed in the housing compartment. The electric machine controller is mounted to the engine case with a second distance radially between the electric machine controller and the nacelle wall. The second distance is less than the first distance.

The first distance may be equal to or greater than two times the second distance.

An outer side of the electric machine controller may be next to and may geometrically match with an inner side of the nacelle wall in a lateral reference plane perpendicular to the axis.

A radial distance between the electric machine and the engine case may be less than a radial distance between the electric machine controller and the engine case.

The second distance may be equal to or greater than three times the first distance.

An outer side of the electric machine controller may be next to and may be conformal with an inner side of the nacelle wall in a lateral reference plane perpendicular to the axis.

A radial distance between the electric machine and the nacelle wall may be greater than a radial distance between the electric machine controller and the nacelle wall.

The geometry of the outer side of the electronic controller may match the geometry of the inner side of the nacelle wall in a longitudinal reference plane including the axis.

A geometry of an inner side of the electronic controller may match a geometry of an outer side of the engine case in the lateral reference plane.

The electronic controller may be mounted to the engine case.

The electronic controller may be radially closer to the nacelle wall than the engine case.

The electronic controller may be radially spaced from the engine case by an air gap.

The assembly may also include a rotating structure and an electric machine. The rotating structure may include the bladed rotor. The electric machine may be operatively coupled to the rotating structure. The electric machine may be disposed in the housing compartment. The electric machine may be configurable as an electric motor and/or an electric generator. The electronic controller may be configured as or otherwise include an electric machine controller configured to control operation of the electric machine.

A radial distance between the electronic controller and the nacelle wall may be less than a radial distance between the electric machine and the nacelle wall.

A radial distance between the electronic controller and the nacelle wall may be less than two times a radial distance between the electric machine and the nacelle wall.

A radial distance between the electronic controller and the nacelle wall may be less than four times a radial distance between the electric machine and the nacelle wall.

A radial distance between the electronic controller and the nacelle wall may be less than six times a radial distance between the electric machine and the nacelle wall.

A radial distance between the electronic controller and the nacelle wall may be less than eight times a radial distance between the electric machine and the nacelle wall.

A radial distance between the electronic controller and the engine case may be greater than a radial distance between the electric machine and the engine case.

The electric machine may be disposed vertically below the engine case. The electronic controller may be disposed laterally to a side of the engine case.

The assembly may also include a second rotating structure, a second electric machine and a second electronic controller. The second rotating structure may include a second bladed rotor housed by the engine case. The second electric machine may be operatively coupled to the second rotating structure. The second electric machine may be disposed in the housing compartment. The second electronic controller may be configured as or otherwise include a second electric machine controller configured to control operation of the second electric machine. The second electronic controller may be disposed in the housing compartment with the engine case laterally between the electronic controller and the second electronic controller.

The assembly may also include an engine core. The engine core may include a compressor section, a combustor section and a turbine section. The compressor section or the turbine section may include the bladed rotor. The engine case may house the engine core.

An outer side of the nacelle wall may form a peripheral boundary of a flowpath that bypasses the engine core.

The assembly may also include an air circuit configured to cool electronics within the electronic controller.

An outer side of the nacelle wall may be configured to form a peripheral boundary of a flowpath in the aircraft propulsion system. An airflow inlet into the air circuit may be fluidly coupled to the flowpath.

An airflow outlet from the air circuit may be fluidly coupled to the housing compartment.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
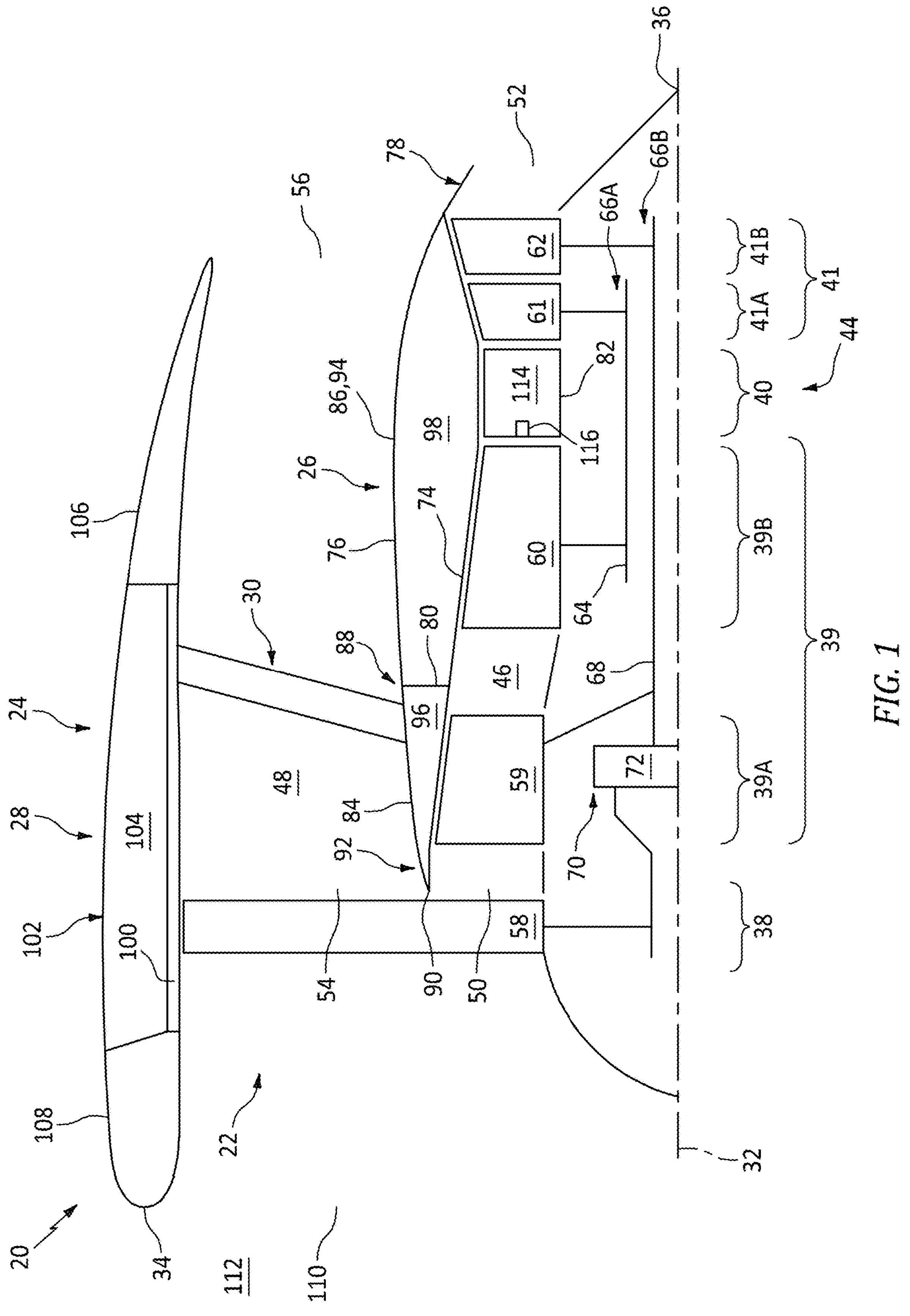
FIG. 1 is a partial schematic illustration of an aircraft propulsion system.

FIG. 1 illustrates a propulsion system 20 for an aircraft. The aircraft may be an airplane, a drone (e.g., an unmanned aerial vehicle (UAV)) or any other manned or unmanned aerial vehicle or system. For ease of description, the aircraft propulsion system 20 is described below as a turbofan propulsion system. The present disclosure, however, is not limited to such an exemplary aircraft propulsion system. The aircraft propulsion system 20, for example, may alternatively be configured as a turbojet propulsion system, a turboprop propulsion system, a turboshaft propulsion system, a propfan propulsion system, a pusher fan propulsion system, or any other type of ducted and/or open propulsor rotor propulsion system.

The aircraft propulsion system 20 includes a gas turbine engine 22 (e.g., a turbofan engine) housed within a stationary propulsion system housing 24. This propulsion system housing 24 of FIG. 1 includes an inner housing structure 26, an outer housing structure 28 and a guide vane structure 30 (e.g., a fan exit guide vane (FEGV) structure) extending radially between and connected to the inner housing structure 26 and the outer housing structure 28. The aircraft propulsion system 20 extends axially along an axis 32 of the aircraft propulsion system 20 between an axial upstream, forward end 34 of the aircraft propulsion system 20 and an axial downstream, aft end 36 of the aircraft propulsion system 20. Briefly, the propulsion system axis 32 may be a centerline axis of the aircraft propulsion system 20, the turbine engine 22 and/or one or more of its members. The propulsion system axis 32 may also or alternatively be a rotational axis for one or more members of the turbine engine 22.

The aircraft propulsion system 20 and its turbine engine 22 of FIG. 1 include a propulsor section 38 (e.g., a fan section), a compressor section 39, a combustor section 40 and a turbine section 41. The compressor section 39 of FIG. 1 includes a low pressure compressor (LPC) section 39A and a high pressure compressor (HPC) section 39B. The turbine section 41 of FIG. 1 includes a high pressure turbine (HPT) section 41A and a low pressure turbine (LPT) section 41B. At least (or only) the LPC section 39A, the HPC section 39B, the combustor section 40, the HPT section 41A and the LPT section 41B collectively form a core 44 (e.g., a gas generator) of the turbine engine 22. The aircraft propulsion system 20 and its turbine engine 22 of FIG. 1 also include a core flowpath 46 (e.g., an annular core flowpath) and a bypass flowpath 48 (e.g., an annular bypass flowpath). The core flowpath 46 extends sequentially through the LPC section 39A, the HPC section 39B, the combustor section 40, the HPT section 41A and the LPT section 41B from an airflow inlet 50 into the core flowpath 46 to a combustion products exhaust 52 out from the core flowpath 46. The bypass flowpath 48 extends through a bypass duct from an airflow inlet 54 into the bypass flowpath 48 to an airflow exhaust 56 from the bypass flowpath 48, where the bypass duct may be formed by the inner housing structure 26 and the outer housing structure 28. The bypass flowpath 48 and its bypass duct are configured to bypass (e.g., are disposed radially outboard of and extend along) the engine core 44 and the inner housing structure 26.

The propulsor section 38, the LPC section 39A, the HPC section 39B, the combustor section 40, the HPT section 41A and the LPT section 41B may be arranged sequentially along the propulsion system axis 32 within the propulsion system housing 24. The propulsor section 38 includes a bladed propulsor rotor 58; e.g., a fan rotor. The LPC section 39A includes a bladed low pressure compressor (LPC) rotor 59. The HPC section 39B includes a bladed high pressure compressor (HPC) rotor 60. The HPT section 41A includes a bladed high pressure turbine (HPT) rotor 61. The LPT section 41B includes a bladed low pressure turbine (LPT) rotor 62. Each of these engine rotors 58-62 includes a rotor base (e.g., a disk or a hub) and a plurality of rotor blades (e.g., airfoils, vanes, etc.). The rotor blades may be arranged into one or more stages axially along the respective engine rotor 58-62. The rotor blades in each stage are arranged and may be equispaced circumferentially around the respective rotor base in an annular array. Each of the rotor blades is connected to the respective rotor base. The rotor blades, for example, may be formed integral with or mechanically fastened, welded, brazed and/or otherwise attached to the respective rotor base. Each of the rotor blades projects spanwise (e.g., radially) out from the respective rotor base to a distal tip of the respective rotor blade.

The HPC rotor 60 is coupled to and rotatable with the HPT rotor 61. The HPC rotor 60 of FIG. 1, for example, is connected to the HPT rotor 61 through a high speed shaft 64. At least (or only) the HPC rotor 60, the HPT rotor 61 and the high speed shaft 64 collectively form a high speed rotating structure 66A; e.g., a high speed spool of the turbine engine 22 and its engine core 44. This high speed rotating structure 66A of FIG. 1 and its members 60, 61 and 64 are rotatable about the propulsion system axis 32. However, it is contemplated the high speed rotating structure 66A may alternatively be rotatable about another axis radially and/or angularly offset from the rotational axis of the propulsor rotor 58 and/or the centerline axis of the turbine engine 22.

The LPC rotor 59 is coupled to and rotatable with the LPT rotor 62. The LPC rotor 59 of FIG. 1, for example, is connected to the LPT rotor 62 through a low speed shaft 68. At least (or only) the LPC rotor 59, the LPT rotor 62 and the low speed shaft 68 collectively form a low speed rotating structure 66B; e.g., a low speed spool of the turbine engine 22 and its engine core 44. This low speed rotating structure 66B of FIG. 1 and its members 59, 62 and 68 are rotatable about the propulsion system axis 32. However, it is contemplated the low speed rotating structure 66B may alternatively be rotatable about another axis radially and/or angularly offset from the rotational axis of the propulsor rotor 58 and/or the centerline axis of the turbine engine 22.

The low speed rotating structure 66B is coupled to the propulsor rotor 58 through a rotating structure-to-propulsor (RSP) drivetrain 70. The RSP drivetrain 70 may be configured as a geared drivetrain, where a geartrain 72 (e.g., a transmission, a speed change device, an epicyclic geartrain, etc.) is disposed between and operatively couples the propulsor rotor 58 to the low speed rotating structure 66B and its LPT rotor 62. With this arrangement, the propulsor rotor 58 may rotate at a different (e.g., slower) rotational speed than the low speed rotating structure 66B and its LPT rotor 62. Here, the propulsor rotor 58 and the low speed rotating structure 66B may rotate in a common (the same) direction about the propulsion system axis 32 or in opposite directions about the propulsion system axis 32 depending, for example, upon the specific configuration of the geartrain 72. Alternatively, the RSP drivetrain 70 may be configured as a direct-drive drivetrain, where the geartrain 72 is omitted. With such an arrangement, the propulsor rotor 58 rotates at a common (the same) rotational speed as the low speed rotating structure 66B and its LPT rotor 62.

The inner housing structure 26 is configured to support the engine sections 38-41B and provide an aerodynamic cover over the engine core 44. This inner housing structure 26 is also configured to form a radial inner peripheral boundary of the bypass flowpath 48. The inner housing structure 26 of FIG. 1, for example, includes an inner case 74 (e.g., a core engine case) for the turbine engine 22 and its engine core 44, an inner wall structure 76, a core exhaust nozzle structure 78 and a bulkhead 80 (e.g., a firewall).

The inner case 74 is disposed radially outboard of the engine sections 39A-41B and, more particularly, the engine rotors 59-62 and a combustor 82 (e.g., an annular combustor) in the combustor section 40. The inner case 74 also extends axially along (e.g., axially overlaps) and extends circumferentially about (e.g., circumscribes) the engine sections 39A-41B and, more particularly, the engine rotors 59-62 and the combustor 82. The engine rotating structures 66A and 66B (generally referred to as "66") as well as the propulsor rotor 58 may be rotationally coupled to the inner case 74 through one or more internal support structures; e.g., frames. The combustor 82 and a stationary component of the geartrain 72 may be fixedly coupled to the inner case 74 through one or more internal support structures. The inner case 74 may thereby structurally support the engine core 44 as well as the propulsor rotor 58 and the RSP drivetrain 70.

The inner wall structure 76 is configured to provide the aerodynamic cover over the engine core 44 and its inner case 74. This inner wall structure 76 is also configured to form the inner peripheral boundary of the bypass flowpath 48. The inner wall structure 76 of FIG. 1, for example, includes an inner flowpath wall 84 (e.g., an outer casing of the inner housing structure 26) and an inner nacelle structure 86 (e.g., an inner fixed structure (IFS)). The inner flowpath wall 84 may form a radial inner platform for the guide vane structure 30. The inner flowpath wall 84 of FIG. 1, for example, projects axially in an upstream, forward direction from an axial intersection 88 with the inner nacelle structure 86 to a leading edge 90 of a splitter structure 92. Here, the intersection 88 of FIG. 1 is located at or near an axial downstream, aft end of the guide vane structure 30. In other embodiments, however, it is contemplated the intersection 88 may be located even further downstream of the vane structure aft end along the bypass flowpath 48. Referring again to FIG. 1, the inner flowpath wall 84 extends axially along and may circumscribe at least a forward section of the inner case 74. The leading edge 90 of the splitter structure 92 forms a radial outer peripheral boundary of the core inlet 50 and a radial inner peripheral boundary of the bypass inlet 54. An inner barrel 94 of the inner nacelle structure 86 of FIG. 1 extends axially in a downstream, aft direction from the intersection 88 to the core exhaust nozzle structure 78. The inner nacelle structure 86 extends axially along and circumferentially about an aft section of the inner case 74. A trailing edge of the core exhaust nozzle structure 78 forms a radial outer peripheral boundary of the core exhaust 52.

The bulkhead 80 projects radially out from the inner case 74 to the inner flowpath wall 84. The bulkhead 80 is also mechanically fastened and/or otherwise attached to the inner case 74 and the inner flowpath wall 84. The bulkhead 80 of FIG. 1, in particular, is attached to the inner flowpath wall 84 at the intersection 88. The bulkhead 80 extends circumferentially about (e.g., completely around) the inner case 74 and the propulsion system axis 32. This bulkhead 80 may be configured as a firewall or other barrier spatially and/or fluidly dividing a forward inner housing compartment 96 of the inner housing structure 26 from an aft inner housing compartment 98 (e.g., an engine core compartment) of the inner housing structure 26. The forward inner housing compartment 96 may be formed by and extend radially between the inner case 74 and the inner flowpath wall 84. This forward inner housing compartment 96 extends axially along the inner case 74 and the inner flowpath wall 84 in the downstream, aft direction to the bulkhead 80. The aft inner housing compartment 98 may be formed by and extend radially between the inner case 74 and the inner nacelle structure 86. This aft inner housing compartment 98 may also extend axially along the inner case 74 and the inner nacelle structure 86 in the upstream, forward direction to the bulkhead 80.

The outer housing structure 28 is configured to provide an aerodynamic cover over the propulsor section 38. The outer housing structure 28 is also configured to form a radial outer peripheral boundary of the bypass flowpath 48. The outer housing structure 28 of FIG. 1, for example, includes an outer case 100 (e.g., a fan engine case) for the turbine engine 22 and its propulsor section 38, an outer nacelle structure 102 and an outer housing compartment 104. The outer case 100 is disposed radially outboard of, extends axially along and may circumscribe the propulsor section 38 and its propulsor rotor 58. The outer case 100 may thereby house and may be configured as a containment structure for the propulsor section 38 and its propulsor rotor 58. An aft portion of the outer case 100 may also form a forward portion of the outer peripheral boundary of the bypass flowpath 48. The outer nacelle structure 102 is configured to provide an aerodynamic cover over the outer case 100. An aft structure 106 of the outer nacelle structure 102 (e.g., a thrust reverser structure) may form an aft portion of the outer peripheral boundary of the bypass flowpath 48. The outer housing compartment 104 may be formed by and extend radially between the outer case 100 and a cowl (e.g., a fan cowl) of the outer nacelle structure 102. This outer housing compartment 104 may also extend axially along the outer case 100 and the cowl between a forward structure 108 of the outer nacelle structure 102 (e.g., a nacelle inlet structure) and the aft structure 106 of the outer nacelle structure 102. Briefly, the forward structure 108 of the outer nacelle structure 102 projects axially upstream and forward of the outer case 100 to the propulsion system forward end 34, where the forward structure 108 of the outer nacelle structure 102 forms an airflow inlet 110 into the aircraft propulsion system 20.

During operation of the aircraft propulsion system 20 of FIG. 1, ambient air from an environment 112 external to the aircraft and its aircraft propulsion system 20 enters the aircraft propulsion system 20 and its turbine engine 22 through the propulsion system inlet 110. This air is propelled by the rotating propulsor rotor 58 in the aft direction towards the propulsion system aft end 36 and is split by the splitter structure 92 into an outer stream and an inner stream.

The outer stream of the air propelled by the rotating propulsor rotor 58 is directed into the bypass flowpath 48 through its bypass inlet 54. This air entering the bypass flowpath 48 may be referred to as "bypass air". The guide vane structure 30 conditions (e.g., straightens out, de-swirls, etc.) the flow of the bypass air within the bypass duct. This conditioned bypass air is subsequently directed out of the aircraft propulsion system 20 through the bypass exhaust 56 to provide forward thrust. This propulsion of the bypass air may account for a majority of the forward thrust generated by the aircraft propulsion system 20 and its turbine engine 22 of FIG. 1.

The inner stream of the air propelled by the rotating propulsor rotor 58 is directed into the core flowpath 46 through its core inlet 50. This air entering the core flowpath 46 may be referred to as "core air". This core air is compressed by the LPC rotor 59 and the HPC rotor 60 and is directed into a combustion chamber 114 (e.g., annular combustion chamber) of the combustor 82 in the combustor section 40. Fuel is injected into the combustion chamber 114 by one or more fuel injectors 116 and mixed with the compressed core air to provide a fuel-air mixture. This fuel-air mixture is ignited and combustion products thereof flow through and sequentially drive rotation of the HPT rotor 61 and the LPT rotor 62. The rotation of the HPT rotor 61 and the LPT rotor 62 respectively drive rotation of the HPC rotor 60 and the LPC rotor 59 and, thus, compression of the air received from the core inlet 50. The rotation of the LPT rotor 62 also drives rotation of the propulsor rotor 58 through the RSP drivetrain 70.

While the turbine engine 22 is described above with a particular two rotating structure arrangement (e.g., a two-spool architecture), the present disclosure is not limited thereto. For example, the LPC rotor 59 may be omitted to configure the LPT rotor 62 as a power turbine (PT) rotor for the propulsor rotor 58. The turbine engine 22 may also or alternatively include another rotating structure with a bladed compressor rotor in the compressor section 39 and a bladed turbine rotor in the turbine section 41; e.g., an intermediate speed spool for the engine core 44.

Figure 2:
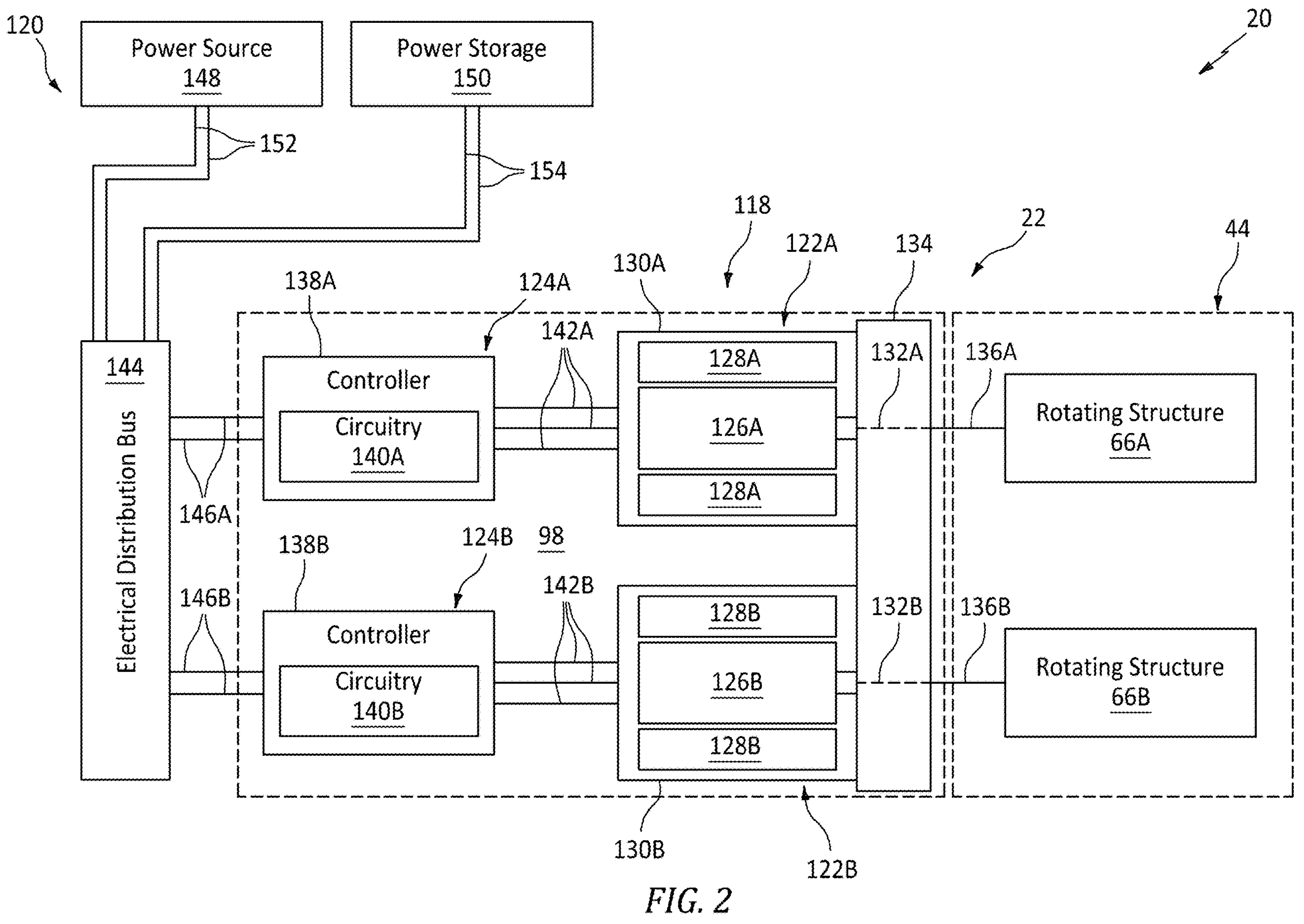
FIG. 2 is a schematic illustration of a portion of the aircraft propulsion system with an electric machine system and an electrical system.

Referring to FIG. 2, the aircraft propulsion system 20 also includes an electric machine system 118 electrically coupled to an electrical system 120 for the aircraft and its aircraft propulsion system 20. The electric machine system 118 of FIG. 2 includes one or more electric machines 122A and 122B (generally referred to as "122") and one or more electric machine (EM) controllers 124A and 124B (generally referred to as "124"). For ease of description, each electric machine 122 of FIG. 2 is described below as being electrically coupled to, controlled by and/or otherwise associated with a single, dedicated one of the EM controllers 124. However, it is contemplated a single EM controller may alternatively be electrically coupled to, may control and/or may otherwise be associated with multiple electric machines. It is also contemplated multiple EM controllers may be electrically coupled to, may control and/or may otherwise be associated with one or more common electric machines.

Each electric machine 122A, 122B of FIG. 2 includes an electric machine rotor 126A, 126B (generally referred to as "126"), an electric machine stator 128A, 128B (generally referred to as "128") and an electric machine housing 130A, 130B (generally referred to as "130"); e.g., a case. The machine rotor 126 is rotatable about a rotational axis of the machine rotor 126. The machine stator 128 is disposed next to and in electromagnetic communication with the machine rotor 126. The machine stator 128 of FIG. 2, in particular, is radially outboard of and circumscribes the machine rotor 126. With this arrangement, each electric machine 122 is configured as a radial flux electric machine. The electric machines 122 of the present disclosure, however, are not limited to such an exemplary rotor-stator configuration nor to radial flux arrangements. The machine rotor 126, for example, may alternatively be radially outboard of and circumscribe the machine stator 128. In another example, the machine rotor 126 may be axially next to the machine stator 128 configuring the respective electric machine 122 as an axial flux electric machine. Referring again to FIG. 2, the machine rotor 126 and the machine stator 128 are at least partially or completely housed within an interior of the machine housing 130.

Each electric machine 122 is operatively coupled to a respective one of the engine rotating structures 66. Each machine rotor 126A, 126B of FIG. 2, for example, is mechanically coupled to a respective gear system 132A, 132B (generally referred to as "132") of a gearbox 134; e.g., an accessory gearbox. Each gearbox gear system 132 is mechanically coupled to the respective engine rotating structure 66A, 66B through a respective drivetrain 136A, 136B (generally referred to as "136"); schematically shown. This drivetrain 136 may be configured as or otherwise include a shaft, a tower shaft assembly, another gearbox (e.g., an angle gearbox), and/or the like. For ease of description, each machine rotor 126 of FIG. 2 is described below as being coupled to and rotatable with a unique one of the engine rotating structures 66 of the aircraft propulsion system 20. However, it is contemplated multiple machine rotors may alternatively be coupled to and rotatable with a common engine rotating structure. It is also contemplated a single one of the machine rotors may be coupled to and rotatable with multiple engine rotating structures, directly or through another device such as a differential or a clutch system.

Each electric machine 122 of FIG. 2 may be configurable as an electric motor and/or an electric generator; e.g., an electric motor-generator. For example, during a motor mode of operation, a respective electric machine 122 may operate as the electric motor to convert electricity received from the aircraft electrical system 120. The machine stator 128, for example, may generate an electromagnetic field with the machine rotor 126 using a current of electricity received from the aircraft electrical system 120 through the respective EM controller 124. This electromagnetic field may drive rotation of the machine rotor 126. The machine rotor 126, in turn, may provide mechanical power to and drive rotation of the respective engine rotating structure 66 through the respective drivetrain 136. This mechanical power may be provided to boost power or completely power the rotation of the respective engine rotating structure 66. By contrast, during a generator mode of operation, the electric machine 122 may operate as the electric generator to convert mechanical power received from the respective engine rotating structure 66 into electricity. Rotation of the machine rotor 126, for example, may be rotationally driven by rotation of the respective engine rotating structure 66 through the respective drivetrain 136. The rotation of the machine rotor 126 may generate an electromagnetic field with the machine stator 128, and the machine stator 128 may convert energy from the electromagnetic field into electricity. The respective electric machine 122 may then provide a current of electricity to the aircraft electrical system 120 through the respective EM controller 124 for storage and/or further use. The electric machines 122 of the present disclosure, however, are not limited to such exemplary operation. For example, one, some or all of the electric machines 122 may alternatively each be configured as a dedicated electric generator; e.g., without the electric motor functionality. One, some or all of the electric machines 122 may alternatively each be configured as a dedicated electric motor; e.g., without the electric generator functionality.

Each EM controller 124A, 124B includes a controller housing 138A, 138B (generally referred to as "138") and internal controller circuitry 140A, 140B (generally referred to as "140"). The controller housing 138 may be configured as an enclosed case (e.g., a closed or sealed container) for the respective controller circuitry 140. The controller circuitry 140 is disposed within an interior of the controller housing 138; e.g., an internal chamber or other volume(s) within and enclosed by the controller housing 138. The controller circuitry 140 includes various electrical components, connectors and the like. Examples of the electrical components include, but are not limited to, printed circuit board(s) (PCB(s)), electrical inductor(s), electrical inverter(s), electrical amplifier(s), electrical switch(es) (e.g., contactor(s), relay(s), etc.), a processing device, memory, a communication module, electrical transformer(s), electrical rectifier(s), and/or the like.

Each EM controller 124A, 124B is electrically coupled to a respective one of the electric machines 122A, 122B through, for example, one or more electrical couplings 142A, 142B (generally referred to as "142"). The controller circuitry 140 of each EM controller 124 of FIG. 2, for example, is electrically coupled to the respective electric machine 122 and its machine stator 128 through the respective electric couplings 142. Similarly, each EM controller 124A, 124B is electrically coupled to an electrical distribution bus 144 of the aircraft electrical system 120 through, for example, one or more electric couplings 146A, 146B (generally referred to as "146"). The controller circuitry 140 of each EM controller 124 of FIG. 2, for example, is electrically coupled to the aircraft electrical system 120 and its electrical distribution bus 144 through the respective electric couplings 146. Examples of the electrical couplings 142 and 146 include, but are not limited to, high voltage electric cables, power feeder cables, power buses, and/or the like.

Each EM controller 124 and its controller circuitry 140 are configured to control operation of a respective one of the electric machines 122. For example, when operating as the electric motor, the respective EM controller 124 and its controller circuitry 140 are configured to regulate a flow of electricity from the aircraft electrical system 120 to the respective electric machine 122. This electricity flow regulation may include: (a) turning-on the flow of electricity from the aircraft electrical system 120 to the respective electric machine 122 (e.g., electrically coupling the respective electric machine 122 to the aircraft electrical system 120); (b) turning-off the flow of electricity from the aircraft electrical system 120 to the respective electric machine 122 (e.g., electrically decoupling the respective electric machine 122 from the aircraft electrical system 120); (c) moderating the flow of electricity from the aircraft electrical system 120 to the respective electric machine 122. Here, the respective EM controller 124 operates as a motor controller. In another example, when operating as the electric generator, the respective EM controller 124 and its controller circuitry 140 are configured to regulate a flow of electricity from the respective electric machine 122 to the aircraft electrical system 120. This electricity flow regulation may include: (a) turning-on the flow of electricity from the respective electric machine 122 to the aircraft electrical system 120 (e.g., electrically coupling the respective electric machine 122 to the aircraft electrical system 120); (b) turning-off the flow of electricity from the respective electric machine 122 to the aircraft electrical system 120 (e.g., electrically decoupling the respective electric machine 122 from the aircraft electrical system 120); (c) moderating the flow of electricity from the respective electric machine 122 to the aircraft electrical system 120. Here, the respective EM controller 124 operates as a generator controller.

The aircraft electrical system 120 includes the electrical distribution bus 144. This aircraft electrical system 120 may also include a power source 148 and/or a power storage 150. The electrical distribution bus 144 is electrically coupled to the electric machines 122 through their respective EM controllers 124 as described above. The electrical distribution bus 144 is also electrically coupled to the power source 148 and the power storage 150 through one or more respective electrical couplings 152 and 154; e.g., high voltage electric cables, power feeder cables, power buses, and/or the like. With this arrangement, the electrical distribution bus 144 provides an intermediate connection between the various electrical members 122A (via 124A), 122B (via 124B), 148 and/or 150. Moreover, it is contemplated the electrical distribution bus 144 may (or may not) also be electrically coupled to and provide the intermediate connection with one or more additional electric components of the aircraft propulsion system 20 and/or one or more additional electric components of the aircraft outside of the aircraft propulsion system 20. Examples of the additional electric components of the aircraft propulsion system 20 include, but are not limited to, sensors, actuators, pumps, valves, an electronic engine controller for the turbine engine 22, and/or the like. Examples of the additional electric components of the aircraft outside of the aircraft propulsion system 20 include, but are not limited to, electric devices mounted with an airframe of the aircraft.

The power source 148 is configured to generate electricity and provide that electricity to the electrical distribution bus 144. The power source 148, for example, may be configured as an electric generator powered by the turbine engine 22 (see FIG. 1). In another example, the power source 148 may be configured as an electric generator powered by another aircraft powerplant; e.g., an engine of a companion aircraft propulsion system, an engine of an auxiliary power unit (APU), a fuel cell system, and/or the like.

The power storage 150 is configured to receive electricity from the electrical distribution bus 144 and store that received electricity as potential energy. The power storage 150 is also configured to release the stored potential energy as electricity output into the electrical distribution bus 144. The power storage 150, for example, may be configured as or otherwise include a battery or an array of batteries (e.g., a battery pack). In another example, the power storage 150 may be configured as or otherwise include one or more capacitors; e.g., supercapacitors.

Figure 3:
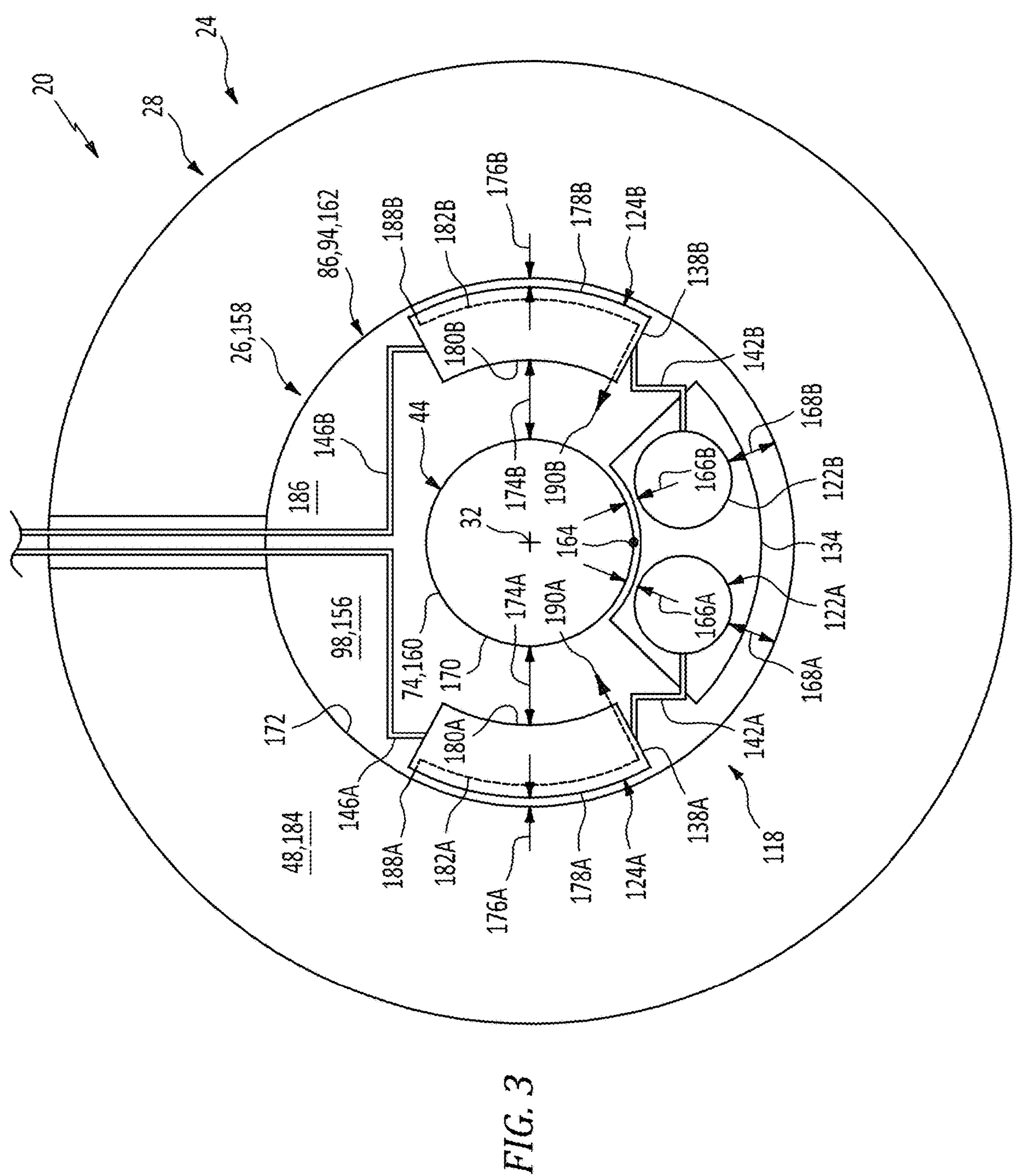
FIG. 3 is a partial cross-sectional schematic illustration of the aircraft propulsion system at the electric machine system.

Referring to FIG. 3, one or more of the electric machines 122 and one or more of the EM controllers 124 may be disposed in a common (the same) housing compartment 156 in a housing structure 158 of the aircraft propulsion system 20. This housing compartment 156 is formed by and extends radially between an engine case 160 of the housing structure 158 and a nacelle wall 162 of the housing structure 158. For ease of description, the housing structure 158 is described below as the inner housing structure 26. The housing compartment 156 is described below as the aft inner housing compartment 98. The engine case 160 is described below as the inner case 74. The nacelle wall 162 is described below as the inner barrel 94 of the inner nacelle structure 86. The present disclosure, however, is not limited to such an exemplary arrangement.

The electric machines 122 may be arranged in a vertical bottom region of the aft inner housing compartment 98. Here, a vertical direction is an up-and-down direction relative to gravity when, for example, the aircraft is on ground and/or flying in level flight. The electric machines 122 of FIG. 3 are located vertically below the inner case 74. These electric machines 122 are also arranged to opposing lateral sides of the propulsion system axis 32 and a bottom dead center (BDC) location 164 of the inner case 74. Here, a lateral direction extends horizontally side-to-side relative to gravity when, for example, the aircraft is on the ground and/or flying in level flight. The lateral direction may thereby be perpendicular to the vertical direction and the propulsion system axis 32. The bottom dead center location 164 corresponds to a vertically lowermost location circumferentially about the inner case 74.

The electric machines 122 of FIG. 3 are mechanically fastened or otherwise attached to the gearbox 134. The gearbox 134 is mechanically fastened or otherwise attached to the inner case 74. The electric machines 122 of FIG. 3 are thereby mounted to the inner case 74 through the gearbox 134. Within the aft inner housing compartment 98, the electric machines 122 may be arranged radially next to or otherwise in close proximity to the inner case 74 to reduce a distance between the electric machines 122 and the engine rotating structures 66 (see FIGS. 1 and 2) to which those electric machines 122 are operatively coupled. Reducing this distance between the electric machines 122 and the engine rotating structures 66 (see FIGS. 1 and 2) may facilitate a reduction in transmission losses through the respective drivetrains 136 (see FIG. 2). Each electric machine 122A, 122B of FIG. 3 is spaced radially out from the inner case 74 by an inner electric machine (EM) distance 166A, 166B (generally referred to as "166"). Each electric machine 122A, 122B is spaced radially in from the inner barrel 94 by an outer electric machine (EM) distance 168A, 168B (generally referred to as "168"). This outer EM distance 168 may be larger than the inner EM distance 166. The outer EM distance 168, for example, may be equal to or greater than two times (2×), four times (4×), six times (6×) or eight times (8×) the inner EM distance 166. A relatively small air gap may thereby be formed radially between each electric machine 122 and a radial outer side 170 of the inner case 74. A relatively large air gap may be formed radially between each electric machine 122 and a radial inner side 172 of the inner barrel 94.

Each EM controller 124 may be arranged in a respective side region of the aft inner housing compartment 98. The EM controllers 124 of FIG. 3, for example, are arranged to opposing lateral sides of the inner case 74 as well as to the opposing lateral sides of the propulsion system axis 32. The EM controllers 124 may also be vertically aligned with the propulsion system axis 32.

Each EM controller 124 may be mechanically fastened or otherwise attached to the inner case 74 through a respective mounting structure (not visible in FIG. 3). Each EM controller 124 of FIG. 3 is thereby mounted to the inner case 74 through the respective mounting structure. Within the aft inner housing compartment 98, each EM controller 124 may be arranged radially next to or otherwise in close proximity to the inner barrel 94 to increase a distance between that EM controller 124 and the relatively hot engine core 44. Increasing this distance may facilitate a reduction in radiant heat energy to which the respective EM controller 124 is subject to during turbine engine operation. Each EM controller 124A, 124B of FIG. 3 is spaced radially out from the inner case 74 by an inner electric machine controller (EMC) distance 174A, 174B (generally referred to as "174"). Each EM controller 124 is spaced radially in from the inner barrel 94 by an outer electric machine controller (EMC) distance 176A, 176B (generally referred to as "176"). This outer EMC distance 176 of FIG. 3 is less than the inner EMC distance 174. The inner EMC distance 174, for example, may be equal to or greater than two times (2×), four times (4×), six times (6×) or eight times (8×) the outer EMC distance 176. A relatively large air gap may thereby be formed radially between each EM controller 124 and the case outer side 170. Increasing a size of this air gap increases a thermal buffer (e.g., an air buffer) between the respective EM controller 124 and the engine core 44 and its inner case 74. A relatively small air gap may be formed radially between each electric machine 122 and the barrel inner side 172.

Figure 4:
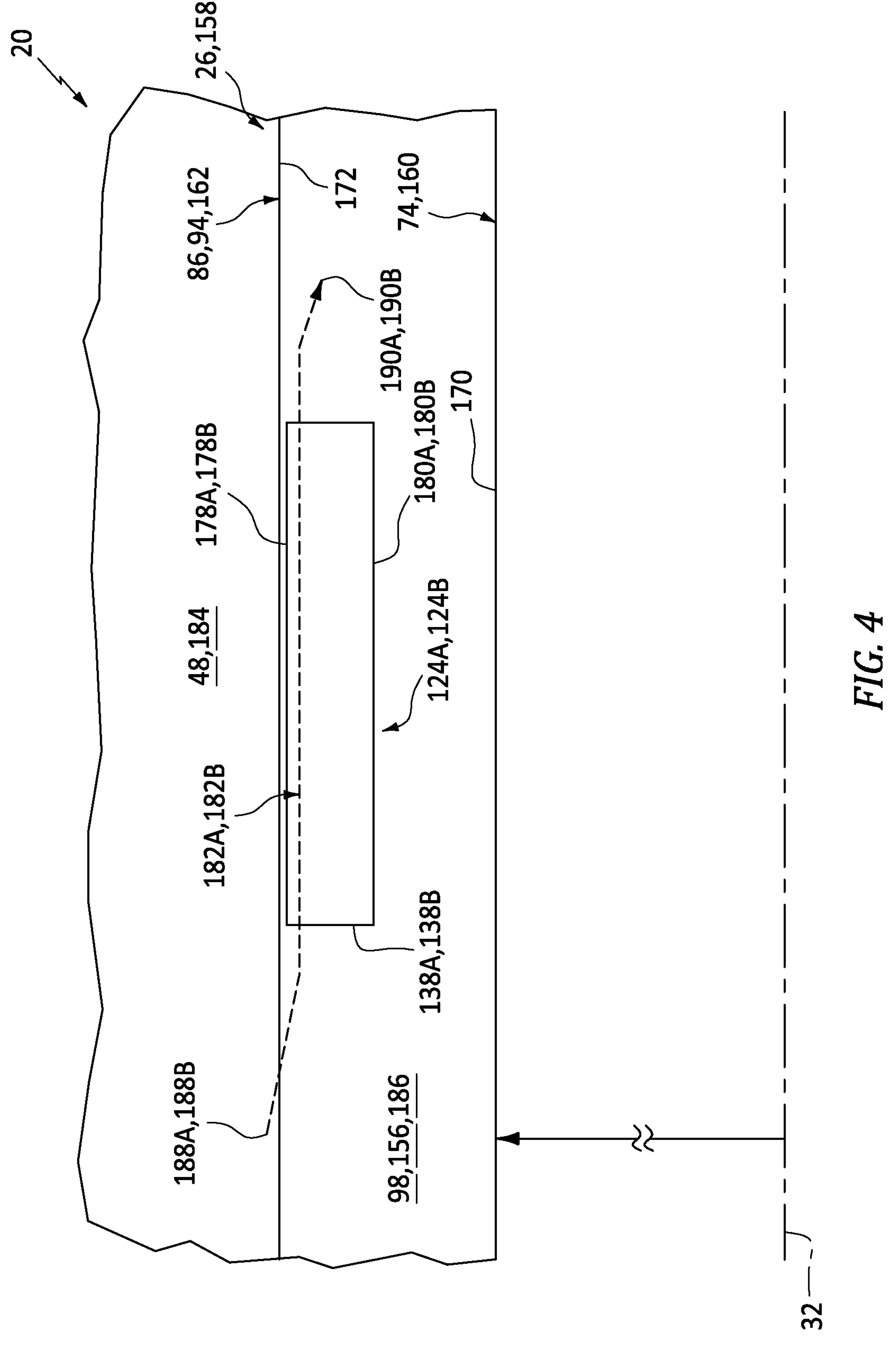
FIG. 4 is a partial side-sectional schematic illustration of the aircraft propulsion system at an electric machine controller.

To increase (e.g., maximize) the thermal buffer between each EM controller 124 and the engine core 44 and its inner case 74, a geometry of the respective EM controller 124 may be configured to conform to a geometry of the inner barrel 94. For example, a radial outer side 178A, 178B (generally referred to as "178") of each EM controller 124A, 124B and its controller housing 138 of FIG. 3 has a geometry tailored to substantially conform to (e.g., match, have an identical shape as, etc.) a geometry of the inner side 172 of a respective section (e.g., half) of the inner barrel 94 when viewed in a lateral reference plane. This lateral reference plane may be a plane perpendicular to the propulsion system axis 32. In the lateral reference plane of FIG. 3, the controller geometry and the inner barrel section geometry may each be arcuate shaped or otherwise curved. Referring to FIG. 4, the geometry of the outer side 178 of each EM controller 124 and its controller housing 138 may also or alternatively be tailored to substantially conform to (e.g., match, have an identical shape as, etc.) the geometry of the inner side 172 of the respective inner barrel section when viewed in a longitudinal reference plane. In the longitudinal reference plane of FIG. 4, the controller geometry and the inner barrel section geometry may each be straight-line shaped or slightly curved. With the arrangement of FIGS. 3 and 4, each EM controller 124 may be shifted radially away from the inner case 74 and closely tucked beneath the inner barrel 94 and its respective inner barrel section.

To further increase (e.g., maximize) the thermal buffer between each EM controller 124 and the engine core 44 and its inner case 74, a geometry of the respective EM controller 124 may also be configured to conform to a geometry of the inner case 74. For example, a radial inner side 180A, 180B (generally referred to as "180") of each EM controller 124A, 124B and its controller housing 138 of FIG. 3 has a geometry tailored to substantially conform to (e.g., match, have an identical shape as, etc.) a geometry of the outer side 170 of a respective section (e.g., half) of the inner case 74 when viewed in the lateral reference plane. In the lateral reference plane of FIG. 3, the controller geometry and the inner case section geometry may each be arcuate shaped or otherwise curved. Referring to FIG. 4, the geometry of the inner side 180 of each EM controller 124 and its controller housing 138 may also or alternatively be tailored to substantially conform to (e.g., match, have an identical shape as, etc.) the geometry of the outer side 170 of the respective inner case section when viewed in the longitudinal reference plane.

With electric machine system arrangement of FIG. 3, the inner EMC distance 174 is sized greater than the inner EM distance 166 and the outer EM distance 168 is sized greater than the outer EMC distance 176. The inner EMC distance 174, for example, may be equal to or greater than three times (3×), five times (5×), seven times (7×) or ten times (10×) the inner EM distance 166. The outer EM distance 168 may be equal to or greater than two times (2×), four times (4×), six times (6×) or eight times (8×) the outer EMC distance 176. The present disclosure, however, is not limited to the foregoing exemplary relationships as these relationships may change due to other propulsion system packaging constraints.

Each of the EM controllers 124A, 124B may be arranged in thermal communication with an air circuit 182A, 182B (generally referred to as "182"). This air circuit 182 may be configured to regulate a temperature of (e.g., cool) the respective EM controller 124 and its controller circuitry 140 (see FIG. 2) using air. Each air circuit 182 of FIG. 3, for example, extends through (and/or along) the respective EM controller 124 between an air source 184 and an air sink 186. An airflow inlet 188A, 188B (generally referred to as "188") into each air circuit 182 is fluidly coupled to the air source 184. This air source 184 of FIG. 3 is configured as the bypass flowpath 48; however, it is contemplated the circuit inlet 188 may alternatively be fluidly coupled to one or more other air sources within the aircraft propulsion system 20 such as the core flowpath 46 along the compressor section 39 (see FIG. 1). An airflow outlet 190A, 190B (generally referred to as "190") from each air circuit 182 is fluidly coupled to the air sink 186. This air sink 186 of FIG. 3 is configured as the aft inner housing compartment 98; however, it is contemplated the circuit outlet 190 may alternatively be fluidly coupled to one or more other air sinks within the aircraft propulsion system 20 such as the bypass flowpath 48.

During operation, each air circuit 182 may receive (e.g., bleed) a flow of the air (e.g., bypass air) from the air source 184 through the respective circuit inlet 188. Heat energy generated during operation of each EM controller 124 and its controller circuitry 140 (see FIG. 2) may be transferred into the air in a heat exchange section of the respective air circuit 182. This heat energy transfer may cool the respective EM controller 124 and its controller circuitry 140 (see FIG. 2) while heating the air within the respective air circuit 182. The heat air may then be exhausted from each air circuit 182 into the air sink 186 through the respective circuit outlet 190. Where the air sink 186 is configured as the aft inner housing compartment 98, the air exhausted from the air circuits 182 may be used to ventilate the aft inner housing compartment 98 and/or convectively cool one or more other propulsion system components within and/or bordering the aft inner housing compartment 98.

While the EM controllers 124 are described above as being mounted to the inner case 74 (the engine case 160), the present disclosure is not limited to such an exemplary arrangement. Each EM controller 124, for example, may alternatively be mounted to the inner barrel 94 (the nacelle wall 162). Moreover, while the electric machines 122 are described above as being arranged in the aft inner housing compartment 98 (the housing compartment 156) along with the EM controllers 124, the present disclosure is not limited to such an exemplary arrangement. For example, it is contemplated one or more of the electric machines 122 may alternatively be arranged radially inboard of the inner case 74 (the engine case 160); e.g., coaxial with the engine rotating structures 66 of FIG. 1. It is still further contemplated that other electronic controllers (e.g., an onboard engine controller such as a FADEC) and/or other electronic devices may be arranged within the aft inner housing compartment 98 (the housing compartment 156) in a similar manner as described above with respect to the EM controllers 124.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. An assembly for an aircraft propulsion system, comprising:

an engine case configured to house a bladed rotor of a turbine engine, the engine case extending axially along and circumferentially about an axis;

a nacelle wall extending axially along and circumferentially about the engine case, the nacelle wall spaced radially outboard from the engine case by a housing compartment, and the housing compartment formed by and radially between the engine case and the nacelle wall; and an electronic controller disposed in the housing compartment radially next to an inner side of the nacelle wall, wherein a geometry of an outer side of the electronic controller matches a geometry of the inner side of the nacelle wall in a lateral reference plane perpendicular to the axis, and the electronic controller is radially closer to the nacelle wall than the engine case.

2. The assembly of claim 1, wherein the geometry of the outer side of the electronic controller matches the geometry of the inner side of the nacelle wall in a longitudinal reference plane including the axis.

3. The assembly of claim 1, wherein a geometry of an inner side of the electronic controller matches a geometry of an outer side of the engine case in the lateral reference plane.

4. The assembly of claim 1, wherein the electronic controller is mounted to the engine case.

5. The assembly of claim 1, wherein the electronic controller is radially spaced from the engine case by an air gap.

6. The assembly of claim 1, further comprising:

a rotating structure comprising the bladed rotor; and an electric machine operatively coupled to the rotating structure, the electric machine disposed in the housing compartment, and the electric machine configurable as at least one of an electric motor or an electric generator;

the electronic controller comprising an electric machine controller configured to control operation of the electric machine.

7. The assembly of claim 6, wherein a radial distance between the electronic controller and the nacelle wall is less than a radial distance between the electric machine and the nacelle wall.

8. The assembly of claim 6, wherein a radial distance between the electronic controller and the engine case is greater than a radial distance between the electric machine and the engine case.

9. The assembly of claim 6, further comprising:

a second rotating structure comprising a second bladed rotor housed by the engine case;

a second electric machine operatively coupled to the second rotating structure, the second electric machine disposed in the housing compartment; and a second electronic controller comprising a second electric machine controller configured to control operation of the second electric machine, the second electronic controller disposed in the housing compartment with the engine case laterally between the electronic controller and the second electronic controller.

10. The assembly of claim 1, further comprising:

an engine core including a compressor section, a combustor section and a turbine section;

the compressor section or the turbine section comprising the bladed rotor; and the engine case housing the engine core.

11. The assembly of claim 10, wherein an outer side of the nacelle wall forms a peripheral boundary of a flowpath that bypasses the engine core.

12. An assembly for an aircraft propulsion system, comprising:

an engine case configured to house a bladed rotor of a turbine engine, the engine case extending axially along and circumferentially about an axis;

a nacelle wall extending axially along and circumferentially about the engine case, the nacelle wall spaced radially outboard from the engine case by a housing compartment, and the housing compartment formed by and radially between the engine case and the nacelle wall;

an electronic controller disposed in the housing compartment radially next to an inner side of the nacelle wall, wherein a geometry of an outer side of the electronic controller matches a geometry of the inner side of the nacelle wall in a lateral reference plane perpendicular to the axis;

a rotating structure comprising the bladed rotor; and an electric machine operatively coupled to the rotating structure, the electric machine disposed in the housing compartment, and the electric machine configurable as at least one of an electric motor or an electric generator;

the electronic controller comprising an electric machine controller configured to control operation of the electric machine, wherein the electric machine is disposed vertically below the engine case, and the electronic controller is disposed laterally to a side of the engine case.

13. An assembly for an aircraft propulsion system, comprising:

an engine case configured to house a bladed rotor of a turbine engine, the engine case extending axially along and circumferentially about an axis;

a nacelle wall extending axially along and circumferentially about the engine case, the nacelle wall spaced radially outboard from the engine case by a housing compartment, and the housing compartment formed by and radially between the engine case and the nacelle wall;

an electronic controller disposed in the housing compartment radially next to an inner side of the nacelle wall, wherein a geometry of an outer side of the electronic controller matches a geometry of the inner side of the nacelle wall in a lateral reference plane perpendicular to the axis; and an air circuit configured to cool electronics within the electronic controller.

14. The assembly of claim 13, wherein an outer side of the nacelle wall is configured to form a peripheral boundary of a flowpath in the aircraft propulsion system; and an airflow inlet into the air circuit is fluidly coupled to the flowpath.

15. The assembly of claim 13, wherein an airflow outlet from the air circuit is fluidly coupled to the housing compartment.

16. An assembly for an aircraft propulsion system, comprising:

a rotating structure comprising at least one of a bladed compressor rotor or a bladed turbine rotor, the rotating structure configured to rotate about an axis;

an engine case extending axially along and circumferentially about the rotating structure;

a nacelle wall extending axially along and circumferentially about the engine case with a housing compartment radially between the engine case and the nacelle wall;

an electric machine disposed in the housing compartment and operatively coupled to the rotating structure, the electric machine mounted to the engine case with a first distance radially between the electric machine and the engine case; and an electric machine controller disposed in the housing compartment, the electric machine controller mounted to the engine case with a second distance radially between the electric machine controller and the engine case, and the second distance greater than the first distance.

17. The assembly of claim 16, wherein an outer side of the electric machine controller is next to and conformal with an inner side of the nacelle wall in a lateral reference plane perpendicular to the axis.

18. The assembly of claim 16, wherein a radial distance between the electric machine and the nacelle wall is greater than a radial distance between the electric machine controller and the nacelle wall.

19. An assembly for an aircraft propulsion system, comprising:

a rotating structure comprising at least one of a bladed compressor rotor or a bladed turbine rotor, the rotating structure configured to rotate about an axis;

an engine case extending axially along and circumferentially about the rotating structure;

a nacelle wall extending axially along and circumferentially about the engine case with a housing compartment radially between the engine case and the nacelle wall;

an electric machine disposed in the housing compartment and operatively coupled to the rotating structure, the electric machine mounted to the engine case with a first distance radially between the electric machine and the nacelle wall; and an electric machine controller disposed in the housing compartment, the electric machine controller mounted to the engine case with a second distance radially between the electric machine controller and the nacelle wall, and the second distance less than the first distance.

* * * * *